(12) United States Patent
Deperraz

(10) Patent No.: US 9,958,081 B2
(45) Date of Patent: May 1, 2018

(54) SHAPE MEMORY ALLOY ACTUATED VALVE ASSEMBLY

(71) Applicant: FLUID AUTOMATION SYSTEMS S.A., Versoix (CH)

(72) Inventor: Nicolas Deperraz, Bons en Chablais (FR)

(73) Assignee: FLUID AUTOMATION SYSTEMS S.A., Versoix (CH)

( * ) Notice: Subject to any disclaimer, the term of this patent is extended or adjusted under 35 U.S.C. 154(b) by 0 days. days.

(21) Appl. No.: 15/277,309

(22) Filed: Sep. 27, 2016

(65) Prior Publication Data
US 2017/0097104 A1    Apr. 6, 2017

(30) Foreign Application Priority Data
Oct. 5, 2015 (GB) .................................... 1517557.3

(51) Int. Cl.
| F16K 31/02 | (2006.01) |
| F16K 27/00 | (2006.01) |
| F03G 7/06 | (2006.01) |
| F16K 31/08 | (2006.01) |
| F16K 11/044 | (2006.01) |
| F16K 31/44 | (2006.01) |

(52) U.S. Cl.
CPC ............ *F16K 31/025* (2013.01); *F03G 7/065* (2013.01); *F16K 11/044* (2013.01); *F16K 27/003* (2013.01); *F16K 31/084* (2013.01); *F16K 31/44* (2013.01)

(58) Field of Classification Search
CPC .... F16K 31/025; F16K 31/084; F16K 11/044; F16K 31/44; F16K 27/003; F03G 7/065
USPC ..................................... 137/269, 270; 251/65
See application file for complete search history.

(56) References Cited

U.S. PATENT DOCUMENTS

| 9,038,983 | B2* | 5/2015 | Kollar et al. ......... F16K 31/025 251/11 |
| 9,086,166 | B2* | 7/2015 | Deperraz ................ F16K 11/10 |
| 2002/0171055 | A1 | 11/2002 | Johnson |
| 2008/0307786 | A1 | 12/2008 | Hafez |
| 2012/0151913 | A1 | 6/2012 | Foshansky |

FOREIGN PATENT DOCUMENTS

| DE | 202010017284 U1 | 8/2011 |
| WO | 2010142452 A1 | 12/2010 |
| WO | 2010142453 A2 | 12/2010 |
| WO | 2012101067 A1 | 8/2012 |
| WO | 2012123088 A1 | 9/2012 |

(Continued)

*Primary Examiner* — Kevin Lee
(74) *Attorney, Agent, or Firm* — The Ollila Law Group LLC

(57) ABSTRACT

A Shape Metal Alloy actuated valve assembly is provided with a support structure having electromechanical connection points arranged on its surface. Actuation of a SMA element, arranged to provide a connection between the support structure contact and the contact on the plunger, will cause the plunger to either move from an open position a closed position or vice versa. The support structure is provided with multiple contact or connection points for engaging an SMA element so that the valve assembly can be configured to provide a normally closed (NC), a normally open (NO), proportional or a latch valve assembly.

19 Claims, 11 Drawing Sheets

(56) References Cited

FOREIGN PATENT DOCUMENTS

| WO | 2013000561 A1 | 1/2013 |
| WO | 2013004380 A1 | 1/2013 |
| WO | 2014162234 A2 | 10/2014 |

* cited by examiner

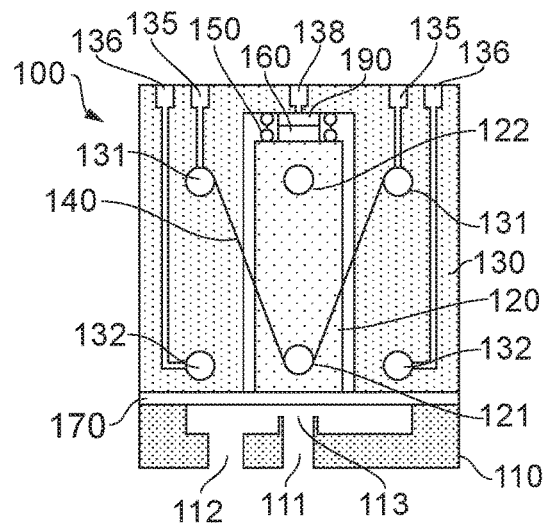
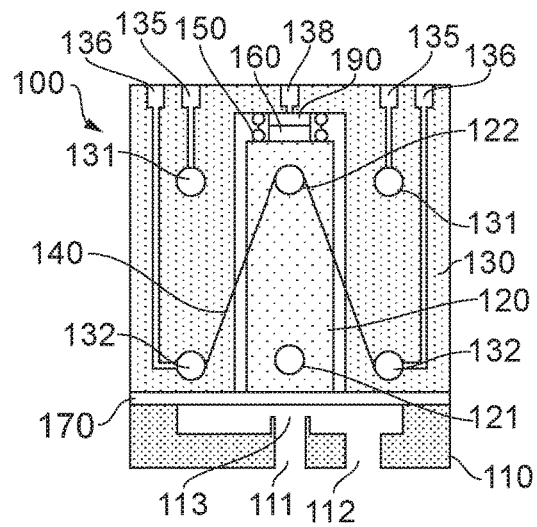
FIG. 4A  FIG. 4B
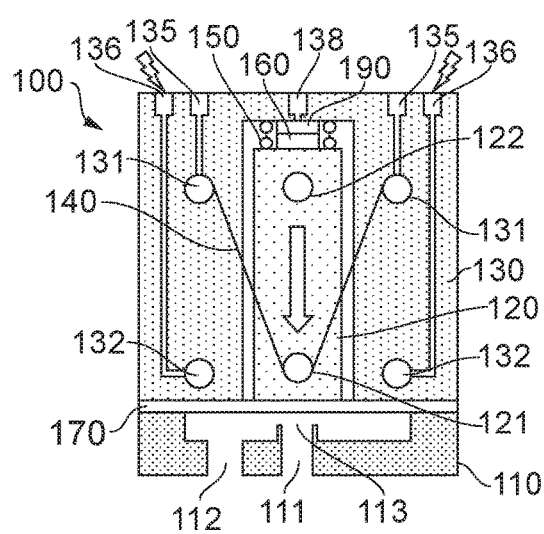
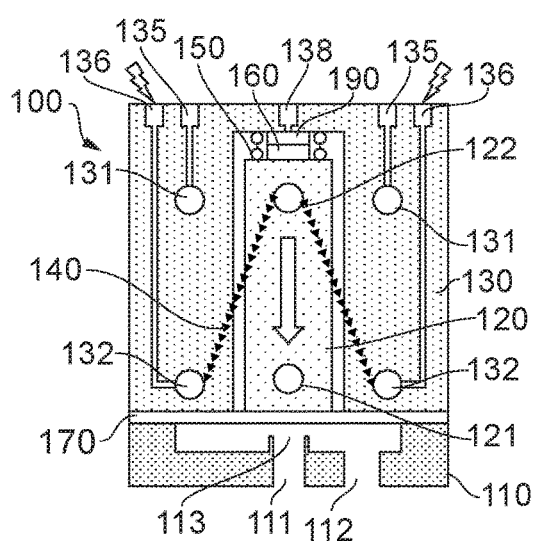
FIG. 5A  FIG. 5B

SHAPE MEMORY ALLOY ACTUATED VALVE ASSEMBLY

TECHNICAL FIELD

The invention relates to a valve assembly, and particularly to a shape memory alloy actuated valve assembly.

BACKGROUND TO THE INVENTION AND PRIOR ART

Fluid handling devices are becoming increasingly popular, and there is an increased demand for fluid handling devices that are both portable and easy to use. Portable fluid handling devices are used in applications such as home care, point of care testing, fuel cells, fragrance dispensers, etc. In order for a portable fluid handling device to be effective and efficient, it should be lightweight, small in size, consume minimal power, operate with low noise, and be cost effective to manufacture. In many applications, it is also important that the fluid handling device provide an accurate and consistent fluid distribution. Therefore, it is preferable to incorporate an efficient fluid valve in the fluid handling device. In many aspects, the fluid valve characterizes the device's efficiency.

One example of a portable valve that attempts to meet the above criteria is a miniature solenoid valve. The miniature solenoid valve however, is not always effective as required by certain implementations. Solenoid valves are typically limited in size, and in order to obtain adequate performance, a solenoid valve typically consumes a substantial amount of power. The power consumption of a solenoid valve, in some circumstances, is unacceptable, especially when using batteries as a power source, for example. The batteries may not be able to provide power to the valve for a sufficient length of time. Furthermore, in some applications, it may be desirable to retain the valve in a specific open or mid-point position. If this position requires continuous actuation of the solenoid, the valve will likely consume a substantial amount of power thereby increasing the cost associated with operating the valve.

Another prior art solution has been the use of electrically actuated piezo valves. Some piezo valves operate using a closing arm that seals against a sealing shoulder when the piezo element is de-activated. These valves typically require a substantial amount of space to operate and may not always provide an adequate solution, as they are subject to clogging when used with liquids that may dry around the orifice.

Another existing solution has been the use of shape memory alloys that transform shape and/or size when heated. Shape Memory Alloy (SMA) actuated valves provide an advantage over the previously mentioned prior art solutions as they can typically be manufactured smaller and generally consume less power. However, many fluid handling devices are applied to situations in which a fast response time is required. Shape memory alloy (SMA) actuated valves can have a slow response time, due to the necessary heating and cooling times to transition between the two states of the SMA element. To compete with traditional technologies, SMA actuated valves should cover all the applications and functions required by a user, while maintaining a high level of performance. The present invention provides a versatile, common architecture which addresses the aforementioned problems.

SUMMARY OF THE INVENTION

Embodiments of the present disclosure aim to improve upon systems for a shape memory alloy actuated valve assembly.

According to a first aspect of the invention, there is provided a shape memory actuated valve assembly, comprising a valve body, having a fluid inlet and a fluid outlet; a plunger, arranged to open and close a fluid flow path between the inlet and the outlet, and having at least one mechanical connection configured to engage with a shape memory alloy element for actuating the plunger; a support structure having at least one first engagement point for coupling a shape memory alloy element to the support structure, and at least one second engagement point for coupling a shape memory alloy element to the support structure. The first and second engagement points are arranged such that actuation of a shape memory alloy element extending between the first engagement point and a mechanical connection point on the plunger can move the plunger to open the fluid flow path, and actuation of a shape memory alloy element extending between the second engagement point and a mechanical connection point on the plunger can move the plunger to close the fluid flow path.

The advantage of the versatile valve assembly provided by the present invention is that it is applicable to many different valve assemblies and valve functions. By having mechanical connection points which may be used in combination with SMA elements to push or pull the valve to and from the open and closed positions means that latching, normally open or normally closed valve functionality can be easily fabricated from the same assembly by attachment of SMA elements in different configurations, as described further below. The actuation of the shape memory allow element may therefore cause a shortening in the length of the shape memory alloy element. This generally creates a tensile force in the shape memory alloy element. This can be caused by heating, which may be caused by passing a current through the shape memory alloy element. The SMA element may be an elongate element such as a wire.

The support structure may comprise a plurality of first engagement points. The support structure may comprise a plurality of second engagement points. The engagement points on the support structure may be electro-mechanical contacts.

The support structure may be a printed circuit board. The printed circuit board may comprise at least one first engagement point on a front face and at least one first engagement point on a reverse face. The printed circuit board may comprise at least one second engagement point on a front face and at least one second engagement point on a reverse face.

The valve assembly may be comprise first and second shape memory alloy elements arranged such that actuation of the first shape memory alloy element opens the fluid flow path, and actuation of the second shape memory alloy element closes the fluid flow path.

The first shape memory alloy element may be actuated via first electrical connections on the printed circuit board, and the second shape metal alloy element may be actuated by second electrical connections on the circuit board. This is preferably achieved by providing a current to the SMA element.

The valve assembly may further comprise a first shape memory alloy element arranged between a first engagement point on the front face and a mechanical plunger connection, and a second shape memory alloy element arranged between a second engagement point on the reverse face and a mechanical plunger connection. The mechanical plunger connection is preferably a projection, a ridge, a fixing means such as a screw/bolt or a weld, or a recess of some kind, arranged to allow forces to be transmitted between the SMA element and the plunger to actuate the plunger.

The plunger may be biased relative to the support structure by a resilient biasing means. The resilient biasing means may be a spring. The resilient biasing means may bias the plunger toward a closed position in which the fluid flow path is closed.

The valve assembly may further comprise a magnet arranged to engage an upper end of the plunger. The magnet may be a permanent magnet.

The valve assembly may be arranged such that actuation of the first shape memory alloy element draws the plunger into contact with the magnet to hold the plunger in an open position in which the fluid path is open.

The valve assembly may further comprise a first shape memory alloy element arranged between a first engagement point on the front face and a mechanical plunger connection, and a second shape memory alloy element arranged between a first engagement point on the reverse face and a mechanical plunger connection. The preferred mechanical plunger connection is configured to allow forces to be transmitted between the SMA element and the plunger.

The valve assembly may be arranged such that actuation of either or both the first and second shape memory alloy elements can open the fluid flow path. The first shape memory alloy element and the second shape metal alloy element are preferably actuated by first electrical connections on the circuit board.

The resilient biasing means may bias the plunger toward a position in which the fluid flow path is open.

The valve assembly may further comprise a first shape memory alloy element arranged between a first engagement point on the front face and a mechanical plunger connection, and a second shape memory alloy element arranged between a first engagement point on the reverse face and a mechanical plunger connection. The reverse face and front face may be any substantially oppositely-facing first and second faces and are preferably arranged on substantially opposing sides of the support structure.

The valve assembly may be arranged such that actuation of either or both the first and second shape memory alloy elements can close the fluid flow path.

The valve assembly may further comprise a deformable membrane disposed between the plunger and the valve body. The deformable membrane preferably isolates the fluid inlet from the fluid outlet and also isolates the actuator from the fluid.

The support structure, which may be a printed circuit board, may be arranged to provide a current to the shape metal alloy elements in order to actuate them.

The valve body may comprise a plurality of fluid inlets and fluid outlets defining a plurality of fluid flow paths.

According to a second aspect of the invention, there is provided a shape memory actuated valve assembly comprising: a valve body, comprising a fluid inlet and a fluid outlet; a support structure; a plunger, arranged between first and second parts of the support structure, and arranged to open or close a fluid flow path between the fluid inlet and the fluid outlet; a shape metal alloy element providing a mechanical connection between the support structure and the plunger and arranged to actuate the plunger relative to the support structure, wherein the shape metal alloy element is located outside the support structure.

The support structure may comprise electromechanical contacts for coupling the shape memory alloy element to the support structure. Electromechanical contacts can provide electrical supply to the SMA element while also resisting the forces necessary to actuate the plunger.

The valve assembly may comprise a resilient biasing means which biases the plunger towards a position in which the fluid flow path is closed.

The valve assembly may be a multiple latch valve assembly. The valve body may therefore comprise a plurality of fluid inlets and fluid outlets defining a plurality of fluid flow paths, wherein the valve assembly comprises a plurality of plungers arranged to open and close respective fluid flow paths. The valve assembly may be arranged such that actuation of one or more first shape memory alloy elements opens and/or closes one or more of the fluid flow paths, and actuation of one or more second shape memory alloy elements opens and/or closes one or more of the fluid flow paths.

A valve sub-assembly may be provided for a shape memory alloy actuated valve assembly according to the first aspect, comprising a valve body, comprising a fluid inlet and a fluid outlet and a flow path therebetween; a support structure, having a plunger receiving area, for receiving a plunger actuatable to selectively open or close a flow path between the fluid inlet and the fluid outlet; at least one first engagement point, for coupling a first shape memory alloy element to the support structure, preferably located proximally to the valve body, to allow actuation of a plunger received in the plunger receiving area, by the first shape memory alloy element, to close the flow path; and at least one second engagement point, for coupling a second shape memory alloy element to the support structure, preferably located distal from the valve body, to allow actuation of a plunger received in the plunger receiving area, by the first shape memory alloy element, to open the flow path.

Further features and advantages of embodiments of the invention will be apparent from the appended claims. It will be apparent that any or all of the above features may be combined in any combination to achieve benefits over prior art arrangements.

BRIEF DESCRIPTION OF THE DRAWINGS

Further features and advantages of the present invention will become apparent from the following description of various embodiments thereof, presented by way of example only, and by reference to the drawings, wherein like reference numerals refer to like parts, and wherein:

FIGS. 4A and 4B show a front and back view of the latching valve assembly according to an embodiment of the present invention where the valve is open.

FIGS. 5A and 5B show a front and back view of the latching valve assembly according to an embodiment of the present invention where the valve is closing.

DETAILED DESCRIPTION OF EMBODIMENTS OF THE INVENTION

Fluid handling devices often require valve assemblies in order to provide accurate and consistent fluid distribution. Valve assemblies generally comprise a plunger, which is movable between a closed position wherein a fluid flow path of the valve is closed, i.e. sealed or cut off, and a second position in which the fluid flow path is open. The plunger may open or close the fluid flow path by actuating a membrane, poppet, or other valve member, to open or close a flow path between one or more inlets and one or more outlets of the valve. When the fluid flow path is open, fluid can flow between a fluid inlet and a fluid outlet. Often the movement of the plunger between the first and second positions is electrically operated, in order to provide accurate fluid distribution. Valve assemblies generally comprise a support structure, on which mechanical connections can be provided to connect the support structure to the plunger for support and/or actuation of the plunger. A force may be applied between the support structure and plunger to move the plunger between the first and second positions. The support structure also maintains the positional relationship between the plunger and the valve assembly.

Shape Memory Alloys (SMAs) have been used to actuate valve assemblies on prior art fluid distribution devices. SMAs are metals that are generally known for their physical transformation temperature.

The Shape Metal Alloy actuated valve assembly of the present invention is provided with a support structure having electromechanical connection points arranged on its surface. Actuation of a SMA element, arranged to provide a connection between the support structure contact and a connection point on the plunger, will cause the plunger to either move from a first position a second position or from the second position to the first position. The first and second position generally comprise a closed position and an open condition. However, proportional control valves can require a gradual or incremental movement between a maximum flow/minimum pressure drop position and a minimum flow/maximum pressure-drop position. The support structure is provided with multiple contact or connection points for engaging an SMA element, so that the valve assembly can be configured to provide a normally closed (NC), a normally open (NO), proportional flow control or a latch-type valve assembly.

Figure 1:
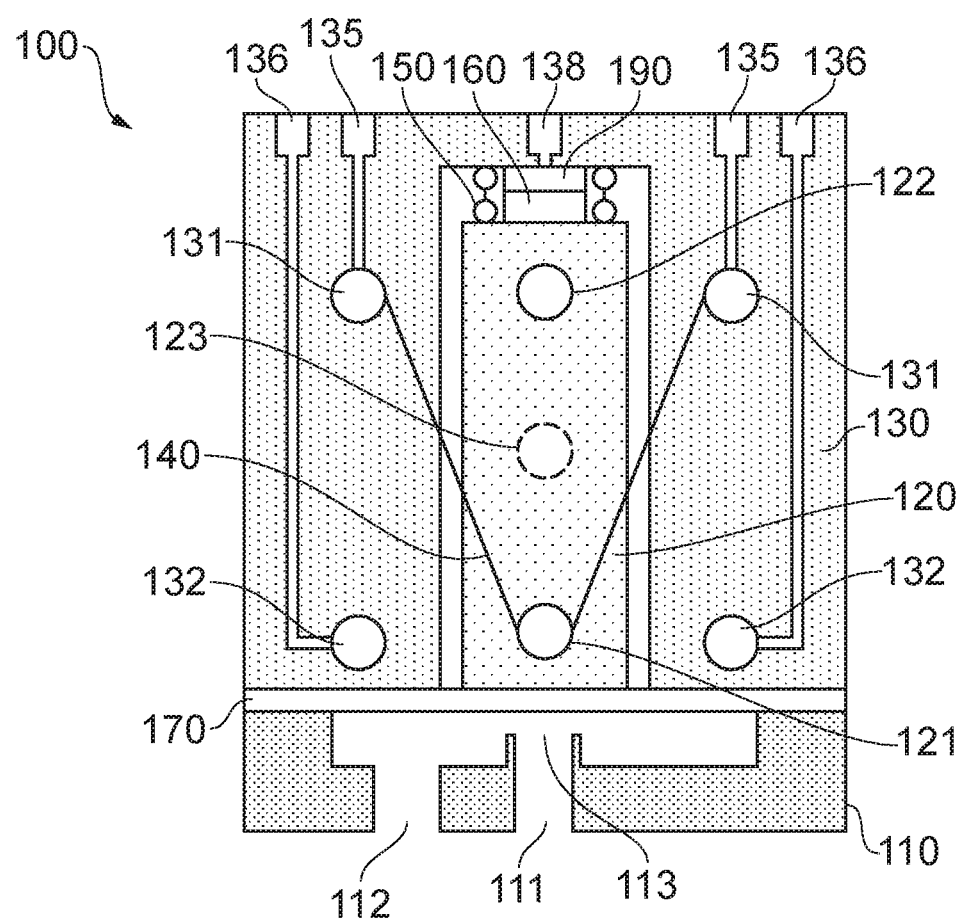
FIG. 1 is shape memory alloy actuated valve assembly according to an embodiment of the present invention.

FIG. 1 shows a valve assembly 100 according to a first embodiment of the present invention. A valve body 110 comprises a fluid inlet 111, a fluid outlet 112 connected by a valve orifice 113. A plunger 120 is provided, being positionable and dimensioned in order that it can move to a closed position, to close the fluid inlet port 111. It may close the inlet port 111 by a substantially linear translational motion. A plunger 120 comprises mechanical connections 121, 122. Mechanical connection 121 is arranged towards the actuating end of the plunger, while mechanical connection 122 is arranged away from the actuating end of the plunger. The actuating end of the plunger is the end which acts to close or open the valve, be it directly by covering orifice 113, or by forcing an intermediate portion to close the orifice 113. A support structure 130 is provided, which supports plunger 120 in a desired orientation for switching the valve between open and closed conditions. The support structure can be disposed about the plunger 120 such that the plunger is substantially between opposite parts of the structure 130. The Support structure 130 comprises first engagement points 131 and second engagement points 132. The second engagement points 132 are arranged toward an actuating end of the plunger, while the first engagement points 131 are arranged substantially away from the actuating end of the plunger.

Although in FIG. 1 there are two first engagement points 131 and two second engagement points 132 shown, it will be appreciated that the valve assembly could function with one first engagement point or one second engagement point 132. Support structure 130 may be a Printed Circuit Board. The Printed Circuit Board (PCB) 130 is provided with electrical connections 135 for providing electric current to engagement points 131, and further provided with second electrical connections 136 for providing electrical current to second engagement points 132. Engagement points 131, 132 are configured for coupling a SMA element 140 to the support structure. Likewise, mechanical connections 121, 122 are configured to engage with a Shape Memory Alloy (SMA) element 140 which is coupled to the support structure 130. SMA element 140 may be coupled to a first engagement point 131 toward a first side of the support structure and to a further first engagement point 131 toward a second side of the plunger, while passing via a mechanical connection 121 on the plunger 120 on its route between those points. SMA element 140 may be a wire element. In the illustrated arrangements, it is possible to have a relatively simple connection between the SMA element and the plunger by effectively 'looping' the SMA element around the connection pin 122 or 121 and connecting to connection points to either side of the support structure 130. This is a straight forward way to provide a balanced force to drive the plunger in a straight direction. However, by providing a fixed connection between a single connection point 131 or 132 and the plunger, a single SMA element can be provided between the plunger and the SMA element to actuate the plunger relative to the support structure.

Isolation membrane 170 is provided between the plunger 120 and a valve orifice 113, located at a fluid ingress or egress point. Pressure provided by the plunger to isolation membrane 170 moves the membrane to close the fluid flow path and maintains a tight seal.

It will be appreciated that SMA elements may comprise a plate, or a film deposition etc. and would still perform the appropriate function. Further, it is possible to only provide a connection between a first engagement point 131 and the mechanical connection 121 on the plunger 120, rather than to provide a symmetrical assembly such as shown in FIG. 1.

The SMA element 140 is actuated to cause movement of the plunger 120. When first engagement points 131 are energized through the provision of an electrical current, the SMA element 140 is thermoelectrically heated. Shape memory alloys are metals that are generally known for their physical transformation at a transformation temperature. By combining the appropriate alloys, the transformation temperature of the SMA element 140 can be determined. The transformation temperature is generally understood as the temperature at which an SMA material transforms from a first, e.g. martensite, crystal structure to a second, e.g. austentite, crystal structure. When the exemplary SMA element 140 is below the transformation temperature, the metal remains in the martensite crystal structure. In the martensite crystal structure, the metal can be physically deformed into a first size and/or shape and can remain in that shape while below the transformation temperature. However, upon heating to above the transformation temperature, the exemplary material transforms into the austentite crystal structure, where the alloy returns to its "memorized", pre-deformed, second size and/or shape. The transformation that occurs in SMA materials is relatively fast as no diffusion occurs as in many types of phase changes. This unique property of SMA materials can be utilized in the valve 100 in order to selectively open or close the valve 100 as discussed below.

The thermoelectrical heating of the SMA element or elements 140 is achieved through applying a differential voltage and/or current between two or more electrical contacts.

It can be seen from the valve assembly shown in FIG. 1 that a SMA element 140 can be arranged in different configurations between the engagement points 131, 132, and the mechanical connections 121, 122 on the plunger, in order that actuation of an attached SMA element 140 can cause the plunger to either open or close the fluid path between inlet and outlet 112 and 111.

As mentioned above, it is not necessary to have exactly two first engagement points 131, however providing a symmetrical arrangement of engagement points around the plunger can provide a more reliable operation of the valve assembly.

It will be appreciated that although two mechanical connections are shown on plunger 120, the valve assembly could operate having one centrally located mechanical connection point 123, shown with a dashed circle in FIG. 1, for connecting with either the first engagement points 131 or a second engagement points 132. A plunger arranged in this way would require fewer materials while maintaining the versatility of being able to be applied to different types of valve assembly. The operating range of the valve in this situation may be smaller due to the length of the SMA element being shorter. Such an arrangement would require that mechanical connections 123 on the front and reverse face be electrically and/or thermally isolated from one another to prevent short circuits between front and reverse SMA elements 140.

FIGS. 2, 3, 4 and 5 show a latching valve assembly according to the present invention. This valve assembly comprises resilient biasing means, preferably in the form of a spring 150, which provides a force which biases the plunger towards the closed position.

Magnet 160 may be provided at a distal end of the plunger from the valve body, otherwise termed a non-actuating end of the plunger. Magnet 160 may be a permanent magnet. A force/pressure sensor 190 may optionally be provided which can indicate, when the plunger is in the "open" position, the force or pressure of the fluid that is applied to the membrane 170. The sensor can be connected to control electronics of the valve assembly, preferably on the PCB.

Figure 2A:
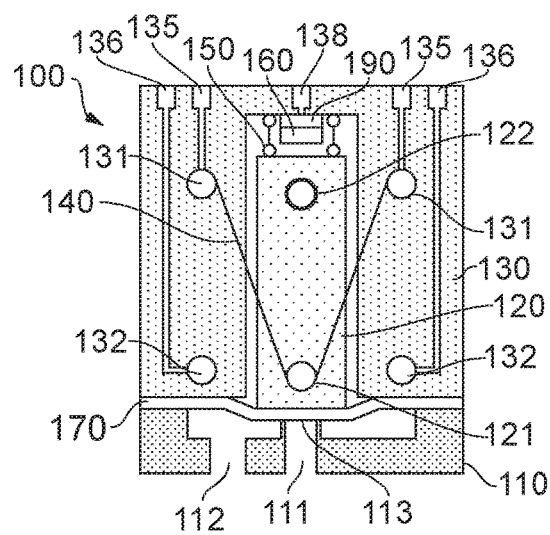
FIGS. 2A and 2B show a front and back view of a latching valve assembly according to an embodiment of the present invention, where the valve is closed.
Figure 2B:
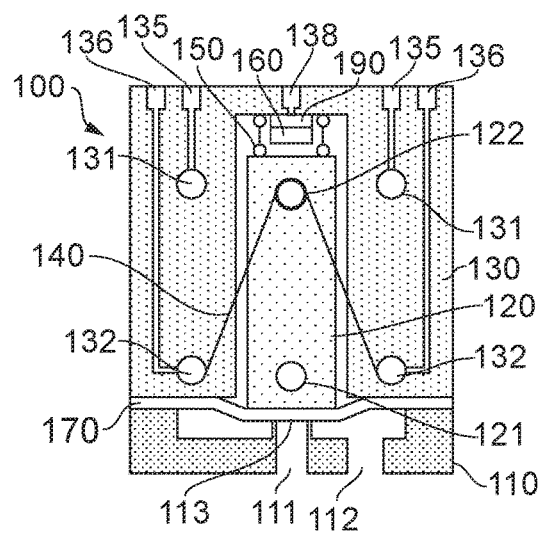

FIG. 2A shows a front view of the latching valve assembly in a closed position. SMA element 140 connects first engagement points 131 via mechanical connection 121 provided on the plunger. FIG. 2A shows the SMA element 140 in its unactuated state. SMA element 140 is therefore providing little or no force on the plunger. Resilient biasing means 150 is providing a biasing force to maintain the plunger in a closed position, in which the flow path between fluid inlet 111 and fluid outlet 112 is closed. FIG. 2B shows a back view of the latching valve assembly when the valve is closed. SMA element 140 is provided to connect the second engagement points 132 provided on the reverse face of PCB 130, via mechanical connection 122 provided on the plunger. Second SMA element 140 shown in FIG. 2B is also unactuated as shown, and is therefore providing little or no force upon the plunger and at least less force than is required to overcome the bias of the biasing means 150.

It can therefore be seen from the valve assembly shown in FIGS. 2A and 2B that this latching valve consumes no electrical energy when in a closed position. That is to say SMA elements 140 provided on the front and reverse faces of PCB 130 require no activation energy, and are not actuated when the valve is closed. When the valve is closed it may be said that the force provided by SMA element 140 provided on the front face of PCB is substantially equal to zero. The force provided by the second SMA element 140 provided on the reverse face is also substantially zero. The force provided by the resilient biasing means is greater than the force of the pressure of fluid at the fluid inlet 111 combined with the force provided by the magnet.

The latching valve assembly of the present invention reduces both opening and closing times of the valves while in operation by using SMA actuating wires arranged to induce opposite motions in the plunger. The response time of the latching valve assembly depends only on the heating time of the SMA elements to actuate the valve, so waiting for the wire to cool is not necessary. Once the valve position is changed, the electrical current can be removed, and so the SMA wires will be cold when required to be actuated. The response time is thus improved.

Figure 3A:
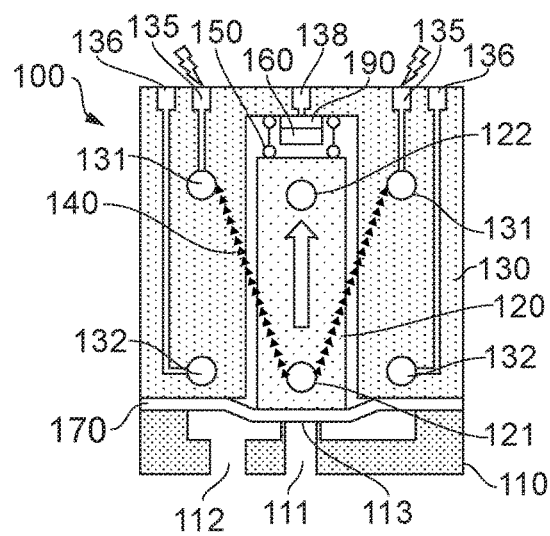
FIGS. 3A and 3B show a front and back view of the latching valve assembly according to an embodiment of the present invention where the valve is opening.
Figure 3B:
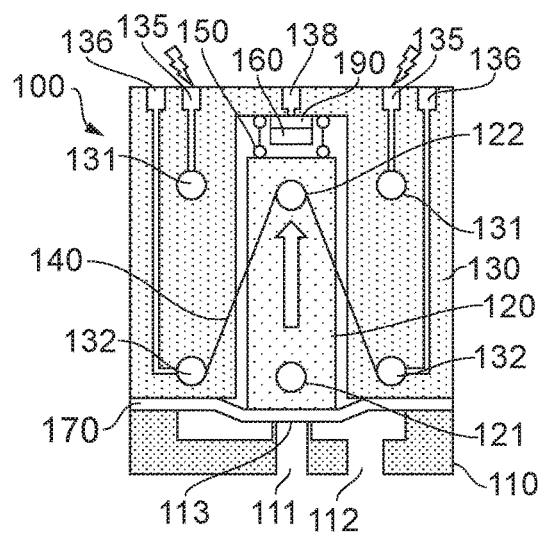

FIGS. 3A and 3B show the latching valve assembly in the present invention in the situation where the valve is to be opened. FIG. 3A shows that electrical current provided via electrical connections 135 to first engagement points 131 will pass to the SMA element 140 due to the electromechanical nature of the engagement points 131. By providing the actuation current to first engagement point 131, SMA element 140 is thermoelectrically heated. When the SMA element is heated to above its transformation temperature the alloy in element 140 will return to its pre-deformed shape. This will therefore provide a force upon the plunger to cause it to move from the closed position to the open position. FIG. 3B shows that the electrical current provided through electrical connections 135 has no effect on the SMA element 140 connected to the second engagement point on the reverse. In FIGS. 3A and 3B it can be said that the force provided by the second SMA element 140 provided on the reverse is zero, given that it is in its unactuated state. The force on the plunger provided by a first SMA element 140 provided on the front face in combination with the force provided by the pressure of the fluid inlet 111 and the force of the magnet is greater than the force provided by resilient biasing means 150. The arrow in the FIGS. 3A and 3B denotes the direction of movement provided by this condition.

FIGS. 4A and 4B show the latching valve assembly in the present assembly in the state where the valve is open. As with FIGS. 2A and 2B, no electrical current is being provided through electrical connections 135 or 136. The valve is open, and therefore there is a fluid flow path which exists between inlet port 111 and fluid outlet port 112. In this situation, the force provided on the plunger by the first SMA element 140 provided on the front face between first engagement points 131 is substantially zero. The force provided by the second SMA element 140 provided on the reverse face, between second engagement points 132 and the plunger, is substantially zero. The force provided by the pressure of the fluid inlet port 111 combined with the force of the magnet on the plunger is greater than the force provided by the resilient biasing means. Therefore, the valve remains open, without the further provision of any electrical power. The valve is latched in its open state.

FIGS. 5A and 5B show the latching valve assembly of the present invention in the state when the valve is to be closed or is closing. FIG. 5A shows that electrical power is provided through electrical connections 136 to the second engagement points 132. It will be appreciated that this provides no actuation energy to first SMA element 140 provided between first engagement points 131 on the front face. It can be seen from FIG. 5B that the electrical power provided through second electrical connections 136 to second engagement points 132 provides actuation of second SMA element 140 located on the reverse face of the PCB 130. It will be appreciated that the force provided to the plunger by SMA element 140 on the front face of the PCB 130 is substantially zero. The combined force of the second SMA element 140 on the reverse face combined with the force of the resilient biasing means is greater than the force of the fluid at fluid inlet port 111 and the retractor force of the magnet 160, and therefore the valve will move to a closed position. This movement is denoted by the arrow shown in the plunger of FIGS. 5A and 5B.

Further to the embodiment described in the foregoing, the versatile support structure of the valve assembly of the present invention can be applied to further valve configurations of different types.

FIGS. 6-9 show an arrangement of the valve assembly which is a normally closed (NC) version. FIGS. 6A and 6B show that first and second SMA elements 140 may be provided on PCB 130 on a front and rear face both connected to first contact elements on the front and rear faces. In FIGS. 6A and 6B the force applied to the plunger by first and second SMA elements 140 is substantially zero and the force provided by resilient biasing means 150 is greater than the fluid pressure and fluid inlet 111. The valve assembly 100 consumes no electrical power when the valve is in the closed position.

Figure 7A:
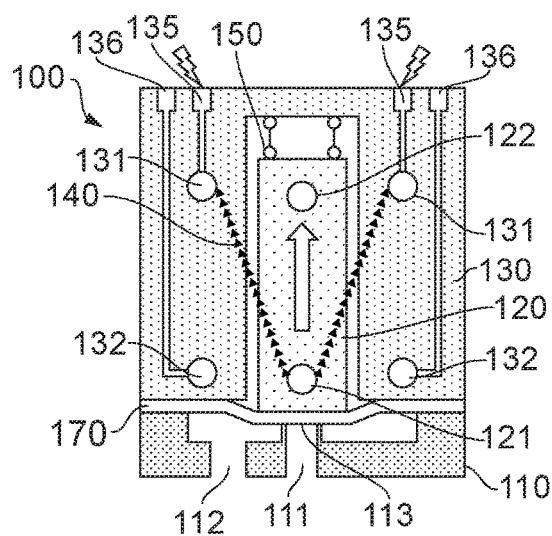
FIGS. 7A and 7B show a front and back view of a normally closed valve assembly according to an embodiment of the present invention where the valve is opening.
Figure 7B:
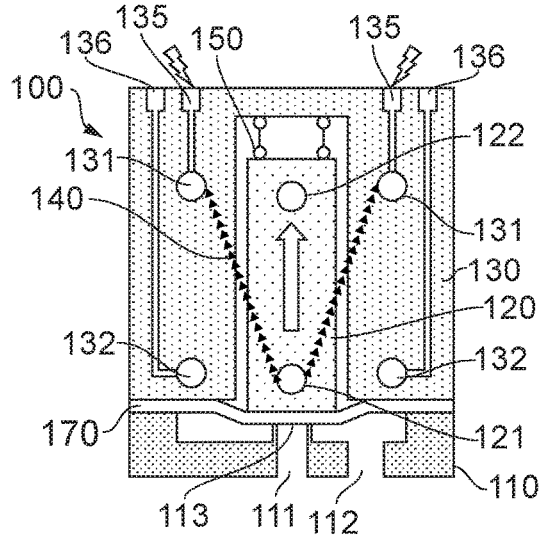

FIGS. 7A and 7B show the normally closed valve assembly in the scenario when the valve is about to be opened. Electrical power is provided from electrical connections 135 through first contacts 131 to SMA element 140 on the front face of the PCB as shown in FIG. 7A. Likewise electrical power is provided through first electrical connections 135 to the second SMA element connected to further first engagement points 131 on the reverse face as shown in FIG. 7B. The electrical actuation of first and second SMA elements 140 provides a force which acts to move the plunger from the closed position of FIG. 7A to an open position, this force being greater than the force of the spring 150. Therefore the plunger will move to the open position as denoted by the arrow shown in FIGS. 7A and 7B.

Figure 6A:
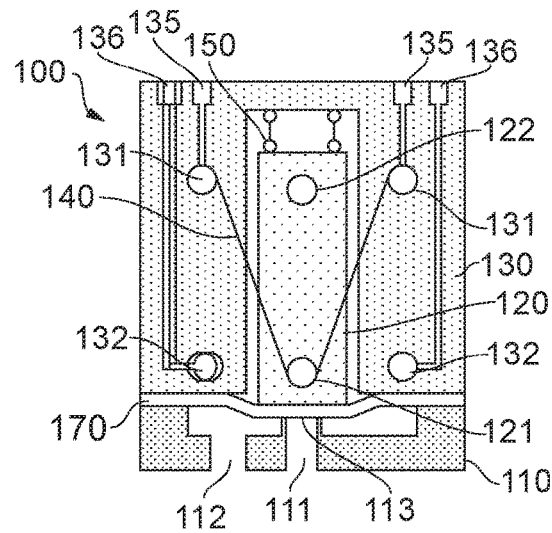
FIGS. 6A and 6B show a front and back view of a normally closed valve assembly according to an embodiment of the present invention where the valve is closed.
Figure 6B:
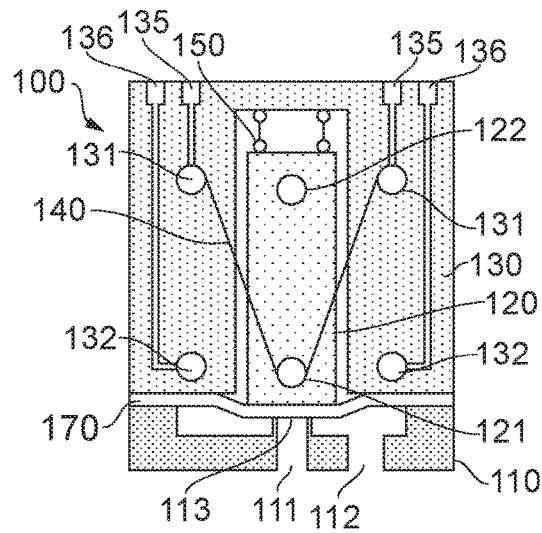
Figure 8A:
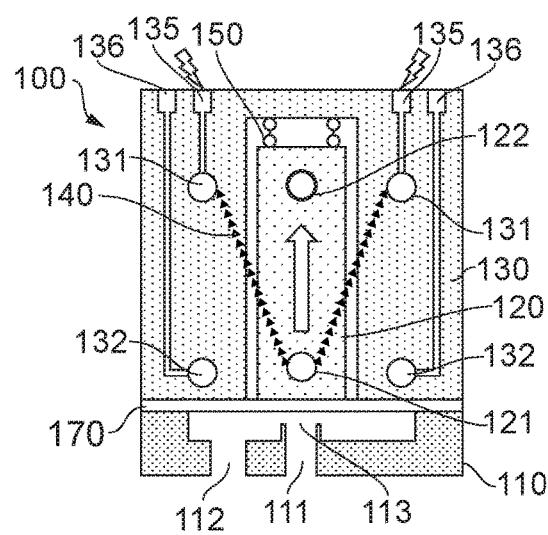
FIGS. 8A and 8B show a front and back view of a normally closed valve assembly according to an embodiment of the present invention wherein the valve is open.
Figure 8B:
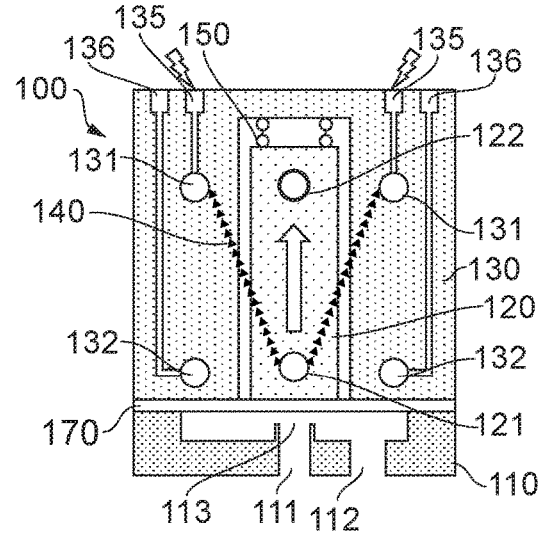

FIGS. 8A and 8B show that electrical power must be maintained in the valve assembly in order to keep the valve open. Were the electrical power supplied to SMA elements 140 to be turned off the SMA elements 140 would fall below their actuation temperatures and revert back to the undeformed state as shown in FIGS. 6A and 6B. By providing electrical power to SMA elements 140 through connections 135 and engagement points 131, the force provided by the first SMA element and second SMA elements 140, combined with the fluid pressure at the fluid inlet port is greater than that of the resilient biasing means and therefore the valve remains open.

Figure 9A:
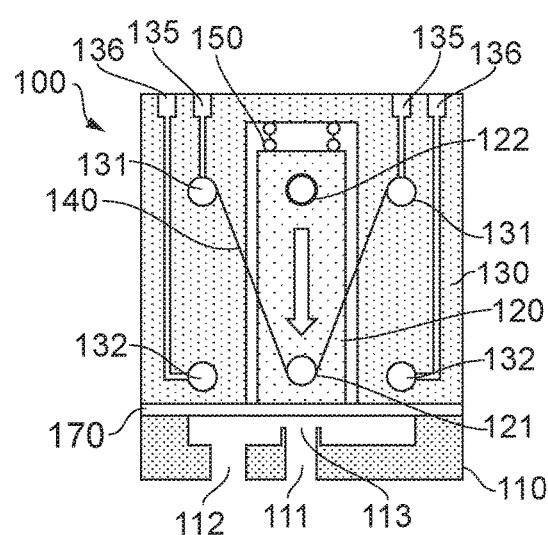
FIGS. 9A and 9B show the front and back view of a normally closed valve assembly according to an embodiment of the present invention where the valve is closing.
Figure 9B:
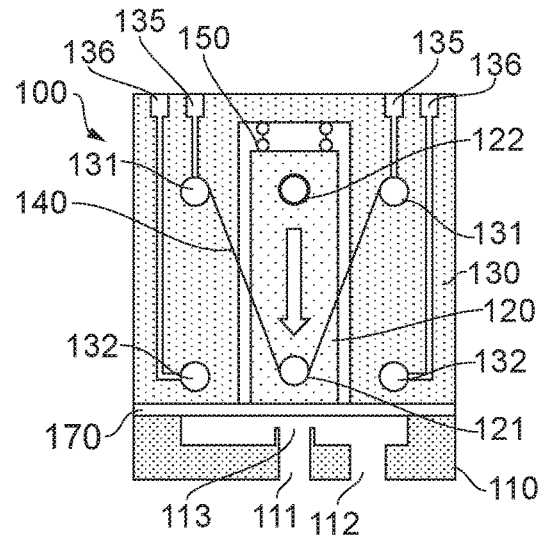

FIGS. 9A and 9B show that when the electrical power provided through electrical connections 135 to SMA elements 140 is turned off, the forces provided by the first and second SMA elements 140 will be zero and in this case the force of the spring is greater than that of the pressure of the fluid at fluid inlet port 111. Therefore the plunger will return to the closed position denoted by the arrow shown in FIGS. 9A and 9B.

FIGS. 10-12 show a normally open (NO) valve assembly according to the present invention. In the normally open valve assembly, the resilient biasing means is arranged to provide a bias towards the open position of the valve assembly. This can be achieved by including a pulling, or tensile, spring 150 as a resilient biasing means.

Figure 10A:
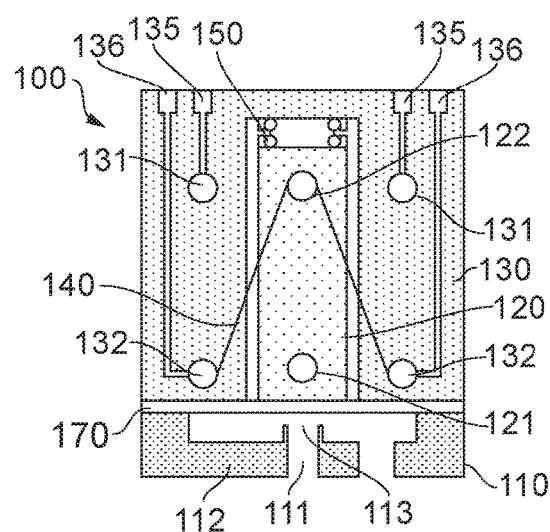
FIGS. 10A and 10B show a front and back view of a normally open valve assembly according to an embodiment of the present invention wherein the valve is closed.
Figure 10B:
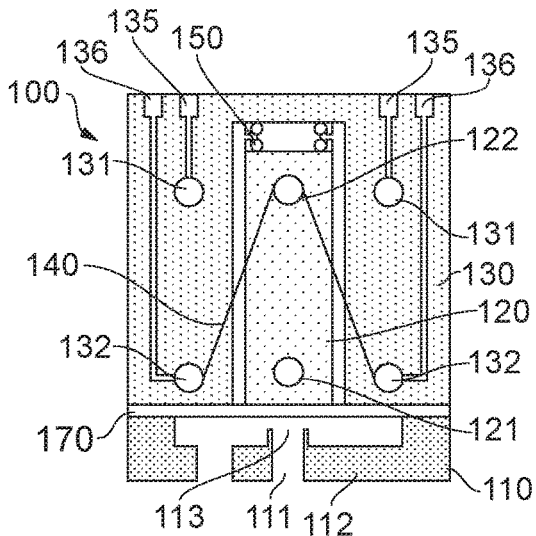

FIGS. 10A and 10B show that in the NO valve assembly, the SMA element 140 is provided between second engagement points 132 on the front face of the printed circuit board 130, via mechanical connections 122.

FIGS. 10A and 10B show the normally open valve assembly in the state when the valve is open. No electrical power is provided through electrical contacts 135 and 136. Therefore the force provided by SMA elements 142 which are provided on the front and reverse basis of the PCB is substantially zero. The force provided by the pulling spring 150 and the pressure of the fluid at fluid inlet 111 is greater than zero and therefore maintains the plunger in a valve open position.

Figure 11A:
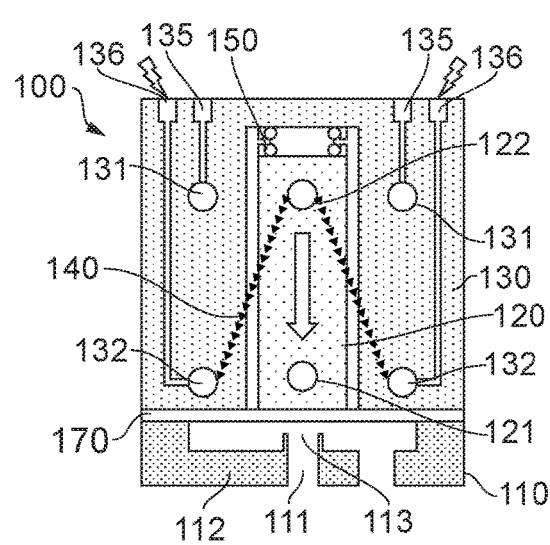
FIGS. 11A and 11B show a front and back view of a normally open valve assembly according to an embodiment of the present invention wherein the valve is opening.
Figure 11B:
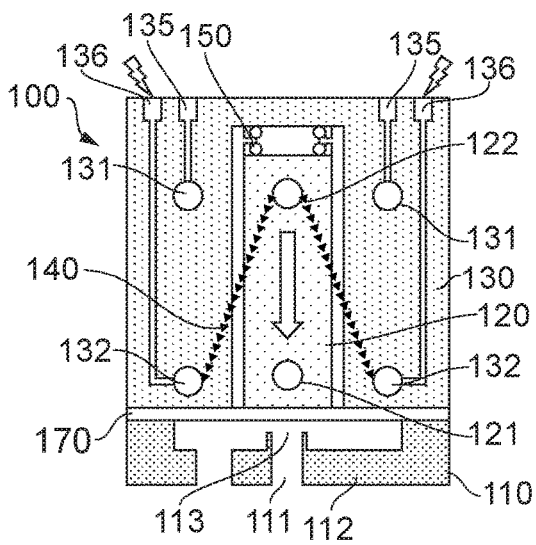

FIGS. 11A and 11B show the normally open valve assembly of the present invention in the situation where the valve is closing or to be closed. Electrical current is provided through electrical connections 136 on the PCB 130, to the second engagement point 132, through to SMA elements 140. The electrical current applied to SMA elements 140 provides them with the actuation energy required to transition between the first and second states such that they provide a pulling force on the plunger 120. The force provided by the first and second SMA elements 140 is greater than the force provided by the spring 150, and the fluid pressure at fluid inlet 111. And therefore the plunger will move to a closed position, thereby closing off the fluid flow between fluid inlet and fluid outlet.

Figure 12A:
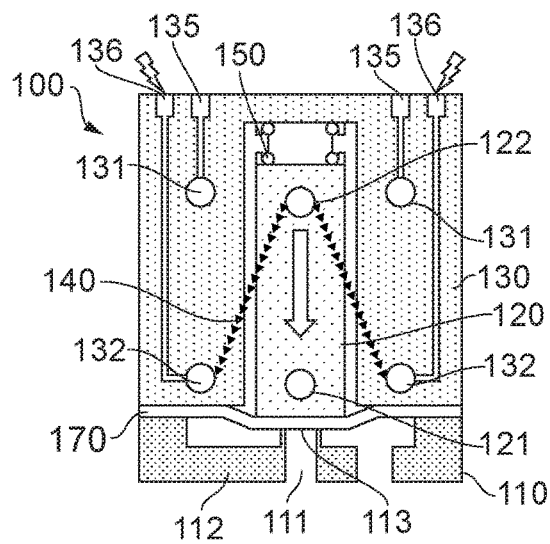
FIGS. 12A and 12B show front and back view of a normally open valve assembly according to an embodiment of the present invention wherein the valve is open.
Figure 12B:
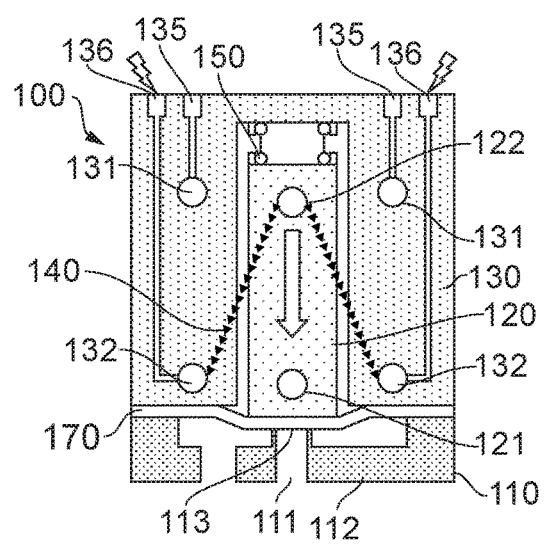

FIGS. 12A and 12B show a normally open valve assembly in the valve closed position. It can be seen that electrical power is provided via electrical connections 136 through second engagement points 132 to the SMA elements 140 provided on the front and reverse faces of the PCB 130. Continuing electric power must be provided to the SMA elements to overcome the force provided by the spring 150 which is biased to move the plunger to a valve open position.

Figure 13A:
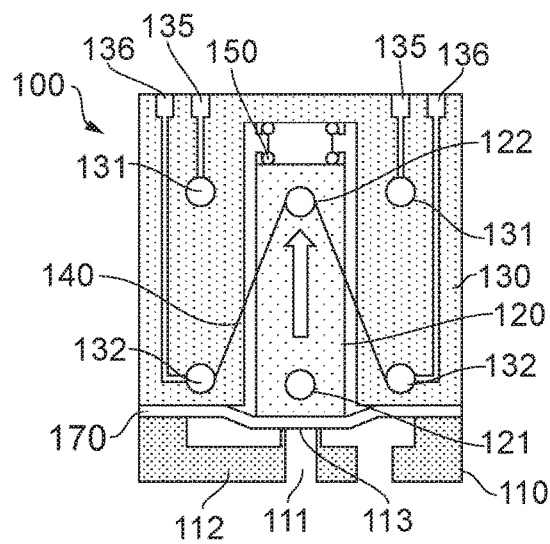
FIGS. 13A and 13B show a front and back view of normally open valve assembly according to an embodiment of the present invention wherein the valve is closing.
Figure 13B:
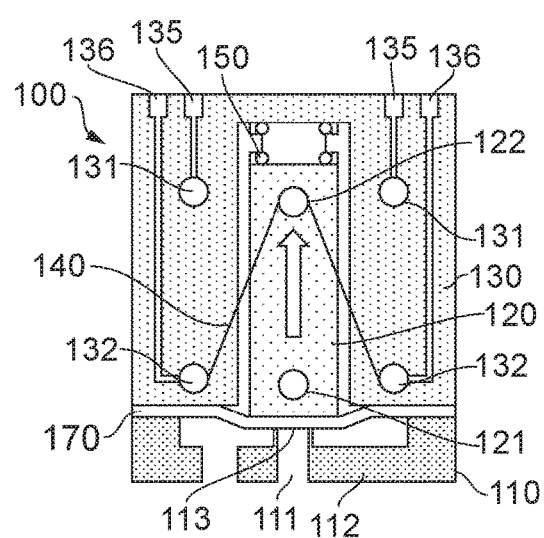

Finally FIGS. 13A and 13B show the normally open valve assembly of the present invention in the situation where the valve is opening or to be opened. When the electrical power supply supplied through connections 136 is turned off, the SMA elements 140 provided on the front and reverse faces of the PCB will cool. Once they cool below their transition temperatures, the force they will provide to counteract the spring force and the pressure of the fluid inlet 111 will revert to zero. The force provided by resilient biasing means 150 and the pressure of the fluid at fluid inlet 111 will cause the plunger to revert to a valve open position. In the case where the forces supplied by the SMA elements is equal to zero, then the valve will revert to the (normally) open state.

Figure 14A:
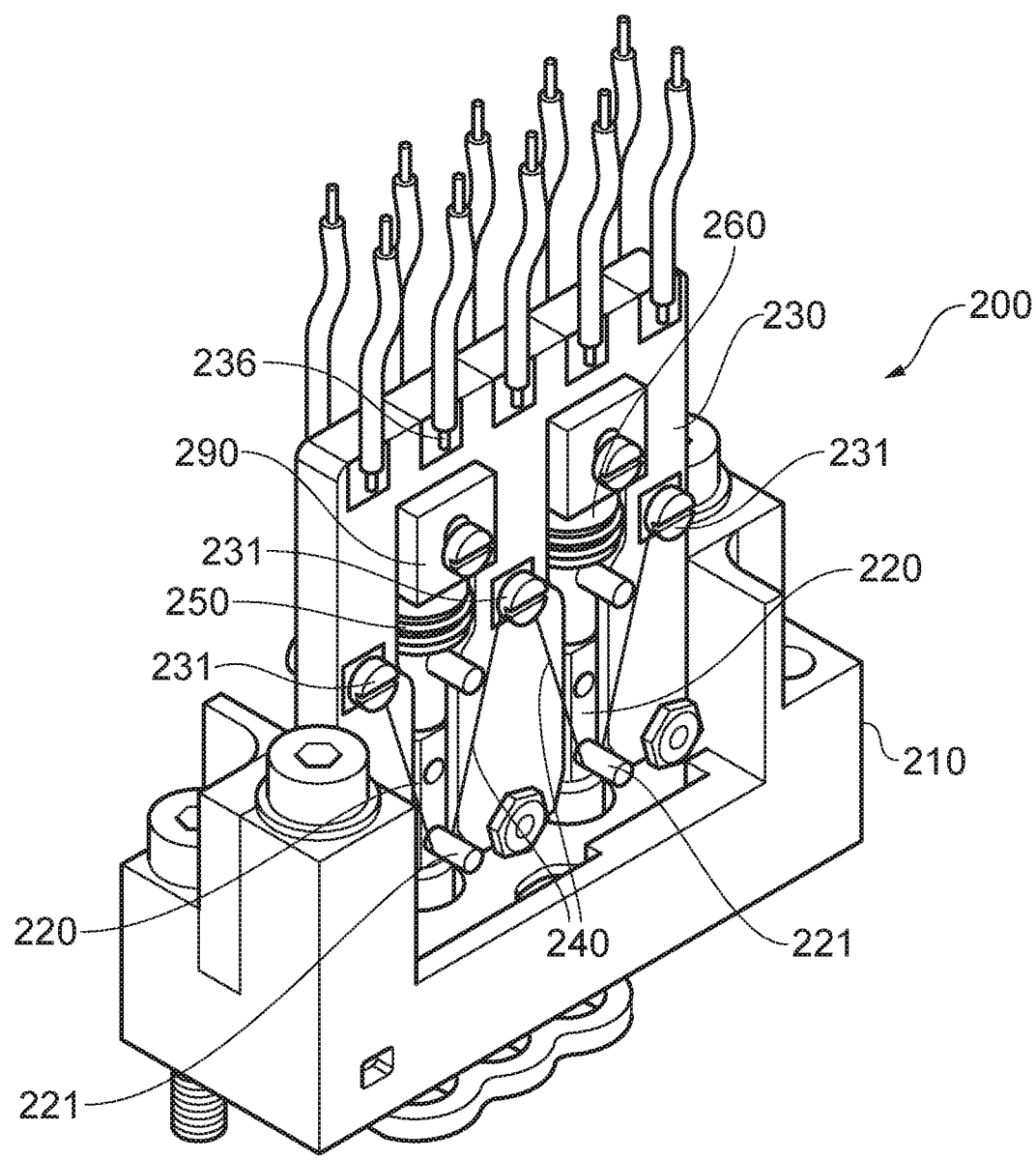
FIGS. 14A to 14C show perspective assembled and exploded views of a double latch valve assembly according to the present invention.

The versatile valve assembly of the present invention can be applied to multiple latch valves, as seen in FIG. 14A. FIG. 14A shows a modified version of the versatile valve assembly of the present invention when implemented in conjunction with a multiple latch valve, in this specific case, a double latch valve. Multiple latch valve arrangements are described in European patent EP 2724062 B1, which is incorporated herein by reference. Specifically, the arrangement illustrated in FIGS. 1 and 2 of EP 2724062 B1 and the related description of the physical structure and control methods for such a valve arrangement are referred to in this respect. Valve assembly 200 comprises a valve body 210 which receives plungers 220 that are supported by support structure 230. The support structure 230 is preferably a PCB, which supports two plungers 220. First SMA mechanical and electrical connections 231 are provided on a front face and a reverse face of the PCB 230, and second mechanical and electrical connections 232 are provided on a reverse face, as can be seen in the exploded view shown in FIG. 14B. Magnets 260 are provided at the end of the plunger distal from the valve body. SMA elements 240 may be connected between the mechanical and electrical connections 231 via a mechanical connection 221 on plunger 220. Magnets 260 hold the plunger 220 such that the valve remains open even when no power is provided to the SMA elements 240.

Figure 14C:
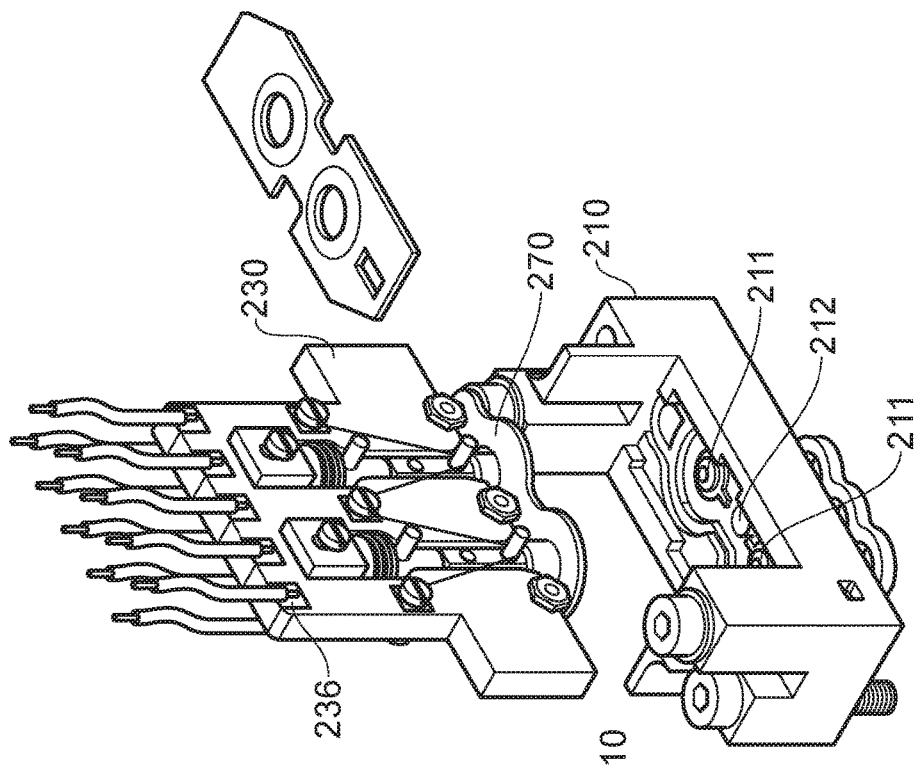
Figure 14B:
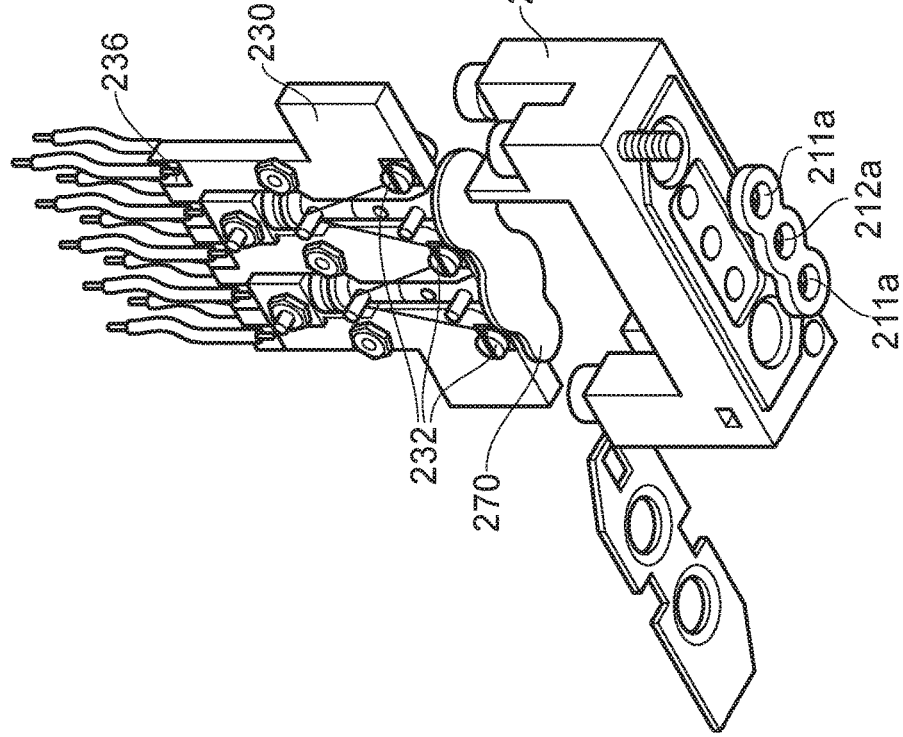

FIG. 14B shows an exploded view of the double latch valve assembly in which the valve seat can be seen. The two plungers 220 apply pressure to this seat when the valve is required to be in a closed position. To operate the valve assembly, electrical power may be selectively provided to the mechanical and electrical connections 236 to cooperatively or independently move the plungers 220 which form the double latching valve assembly. As can be seen in FIG. 14C, the valve comprises two fluid outlets 211 and a fluid inlet 212. When pressure is applied by one or both plungers 220, the fluid flow path between the inlet and outlet is closed by the isolation membrane. These are shown as outlet ports 211a and an inlet port 212a in FIG. 14B. The valve assembly 200 is arranged having three inlet/outlet ports, and two plungers actuated by the SMA elements 240. These two plungers act to close first and second valve orifices provided in the valve body, such that four operating positions are possible. The operating positions of the valve are shown in the table below:

| Valve Orifice 1 | Valve Orifice 2 |
|---|---|
| Closed | Closed |
| Closed | Open |

-continued

| Valve Orifice 1 | Valve Orifice 2 |
|---|---|
| Open | Closed |
| Open | Open |

A sensor (not shown) is also preferably provided in the valve assembly of FIGS. 14A and 14B, between magnet 260 and the support structure. Therefore a plurality of valves may be provided, which are fluidly connected to a plurality of orifices, and which are capable of independent or collective actuation by their respective SMA elements, to provide multiple configurable flow conditions, such as in the particular example describe above. The sensor can determine, when the plunger is in the open position, the fluid pressure or force at the fluid inlet. This information can inform a user of various metrics relating to the valve pressure conditions, such as flow rate, time valve has been open, etc.

Figures 15A, 15B:
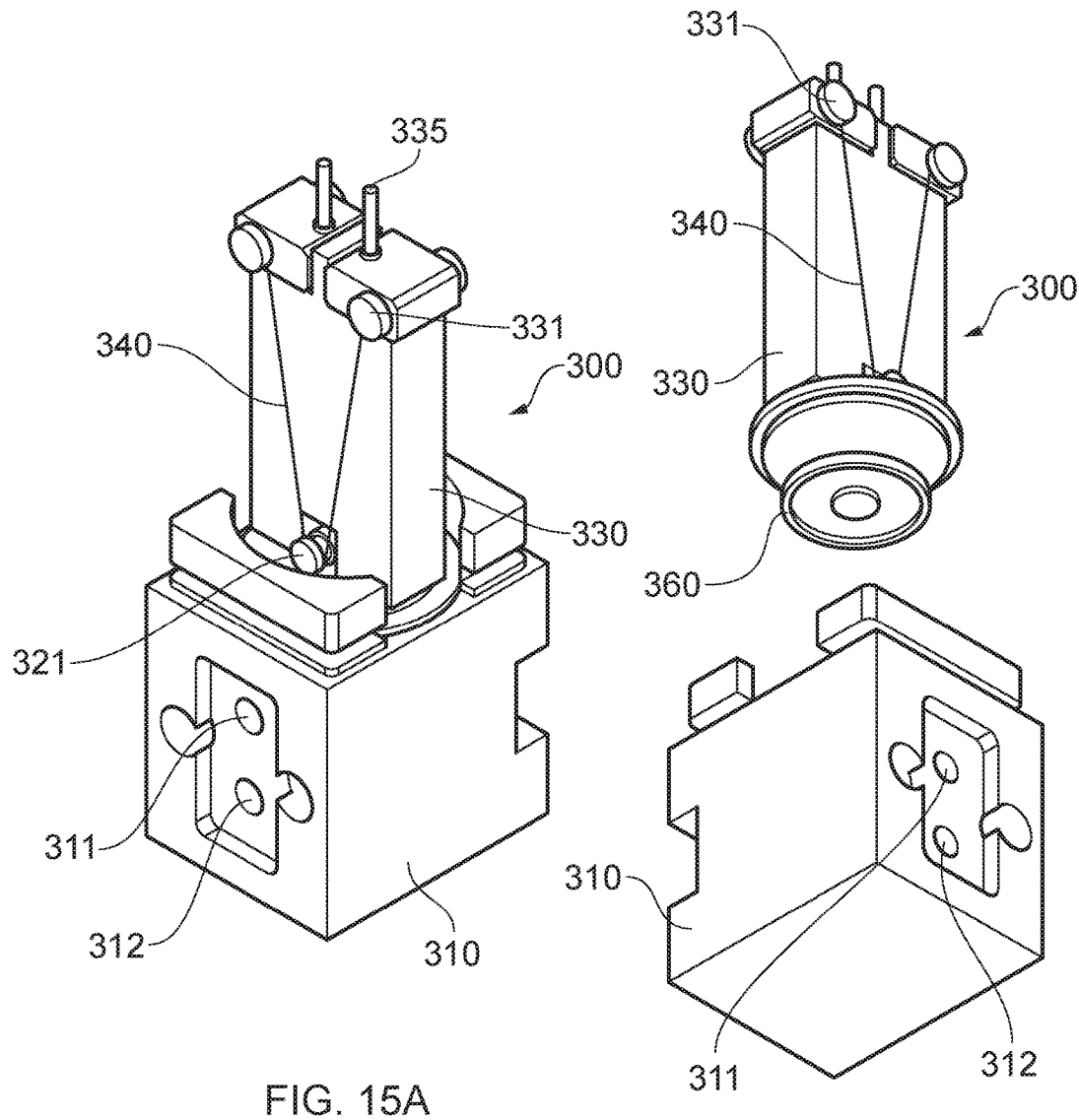
FIGS. 15A and 15B show a perspective view of an alternative valve assembly according to an embodiment of the present invention.

FIG. 15A shows a perspective view of the valve assembly according to a further aspect of the present invention. As can be seen from FIG. 15A a valve assembly 300 comprises a valve body 310, and a support structure 330 which is arranged to surround a plunger 320 on at least two sides. The term "surrounded" on one or more sides is used here to mean that one or more entire side(s) of the plunger is flanked along its length by a part of the support structure. SMA elements 340 are provided on the support structure. In the valve assembly shown in FIG. 15, as in the preceding embodiments, the SMA elements 340 are located on the outside of the support structure 330. Support structure 330 is provided with a combined mechanical and electrical connection at a portion which is distal from the valve body 310. It will be understood that the embodiment shown in FIG. 15A relates to a normally closed valve assembly. It will be appreciated that a support structure such as that seen in FIG. 15A could also be modified to be a normally open, or a latching valve assembly, by arranging the connection points of the SMA element to the support structure and to the plunger as described in relation to the relevant FIGS. 1 to 13B described above for each type of valve arrangement. Proportional control can also be applied to create a proportional control valve. Not shown in FIG. 15A are the resilient biasing means which maintain the valve in its closed position, which may be provided within the support structure 330. An exploded view of the valve assembly of FIG. 15A is shown in FIG. 15B. Isolation membrane 360 can be seen, with a central raised portion arranged to open and close the fluid flow path within the valve.

Figures 16A, 16B:
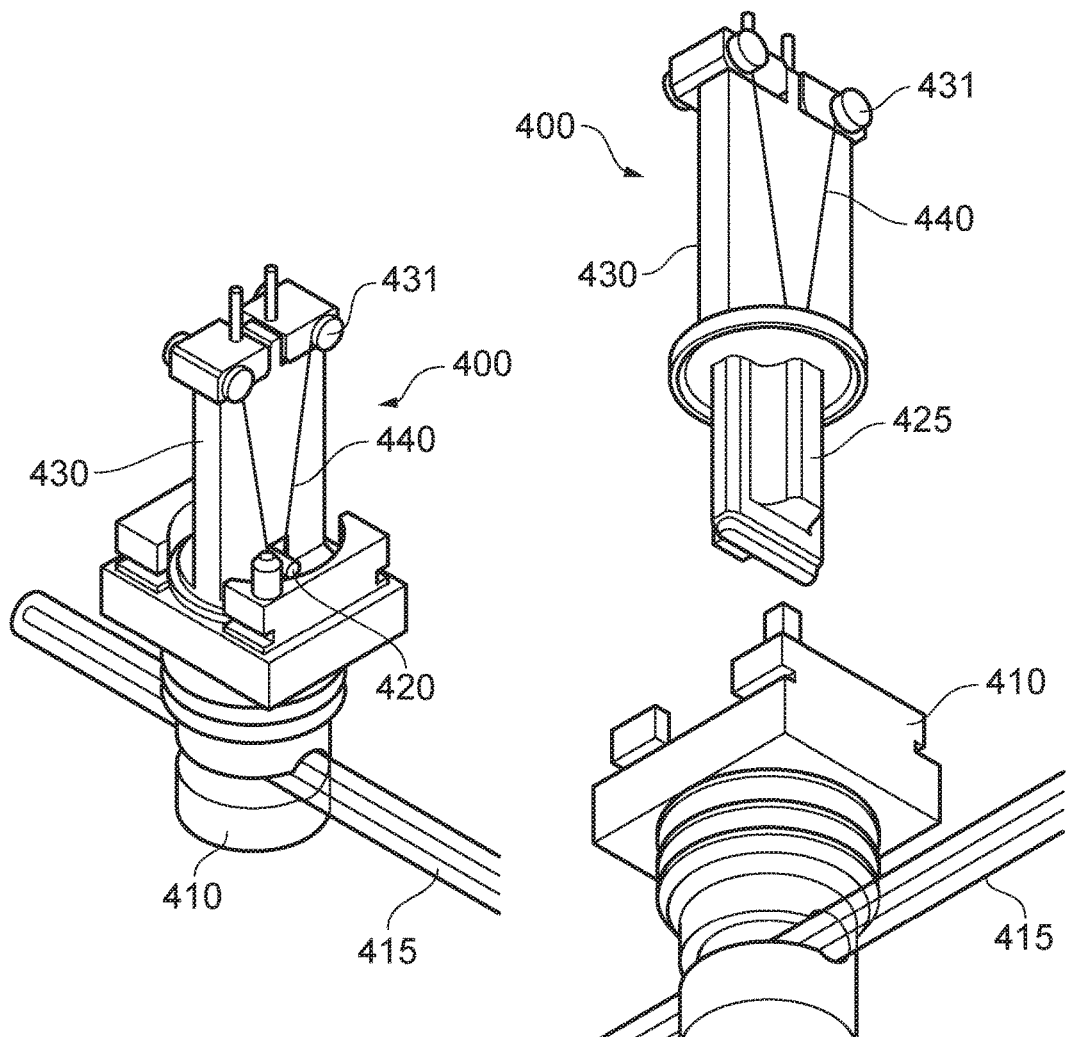
FIGS. 16A and 16B show a perspective view of a further alternative valve assembly according to an embodiment of the present invention, comprising a pinch valve.

A further embodiment of the invention can be seen in FIGS. 16A and 16B, wherein a valve assembly 400 is used in conjunction with a pinch valve. In this device, the valve body receives a soft pipe 415 or tube which may be clamped or pinched by a plunger pinch 425 within the valve assembly in order to obstruct a fluid flow in the soft tube 415. The soft tube 415 is held within valve body 410, and a resilient biasing means (not shown) applies a force to the plunger 420 and plunger pinch 425 to hold the valve in a normally closed (NC) position.

The support structure 430 surrounds the plunger 420 on at least two sides and optionally on all sides, and SMA elements 440 are mounted on the exterior of support structure 430.

The SMA elements 440 held between mechanical and electrical contacts 431 may, upon application of electrical power to the contacts, be heated and change state in the manner described above. This may provide sufficient force to overcome that of the resilient biasing means, to move plunger 420 from a closed position to an open position and open the valve by releasing the pinch pressure on the soft tube 415.

Although a specific form and arrangement of valve body and pinch plunger is shown in FIGS. 16A and 16B, it will be appreciated that aesthetic changes could be made to the device shown whilst still performing the function of the present invention as defined in the appended claims.

The invention claimed is:

1. A shape memory alloy actuated valve assembly, comprising:
   a valve body, having a fluid inlet and a fluid outlet;
   a plunger, arranged to open and close a fluid flow path between the inlet and the outlet, and having at least one mechanical connection point configured to engage with a shape memory alloy element for actuating the plunger;
   a support structure having:
   at least one first engagement point for coupling a first shape memory alloy element to the support structure, and,
   at least one second engagement point for coupling a second shape memory alloy element to the support structure;
   wherein the first engagement point is arranged such that actuation of the first shape memory alloy element, when extending between and connected to the first engagement point and a mechanical connection point on the plunger, can move the plunger to open the fluid flow path,
      the second engagement point is arranged such that actuation of the second shape memory alloy element, when extending between and connected to the second engagement point and a mechanical connection point on the plunger, can move the plunger to close the fluid flow path; and
      the valve assembly further comprising a deformable membrane disposed between the plunger and the valve body.

2. The shape memory alloy actuated valve assembly of claim 1, wherein the support structure comprises a plurality of the first engagement points and a plurality of the second engagement points.

3. The shape memory alloy actuated valve assembly of claim 1, wherein the first and second shape memory alloy elements are elongate elements configured to shorten upon activation.

4. The shape memory alloy actuated valve assembly of claim 1, wherein the engagement points on the support structure are electro-mechanical contacts.

5. The shape memory alloy actuated valve assembly of claim 1 wherein the valve assembly comprises first and second shape memory elements arranged such that actuation of the first shape memory alloy element opens the fluid flow path, and actuation of the second shape memory alloy element closes the fluid flow path.

6. The shape memory alloy actuated valve assembly of claim 5, wherein the support structure is a printed circuit board.

7. The shape memory alloy actuated valve assembly of claim 6, wherein the first shape memory alloy element is attached to and actuated via at least one first electrical connection on the printed circuit board, and the second shape metal alloy element is attached to and actuated by at least one second electrical connection on the printed circuit board.

8. The shape memory alloy actuated valve assembly of claim 5, further comprising a magnet arranged to engage an upper end of the plunger, wherein the valve assembly is arranged such that actuation of the first shape memory alloy element draws the plunger into contact with the magnet to hold the plunger in an open position, in which the fluid path is open.

9. The shape memory alloy actuated valve assembly of claim 8, wherein the magnet is a permanent magnet.

10. The shape memory alloy actuated valve assembly of claim 8, wherein the valve assembly is a multiple latch valve assembly, wherein the valve body comprises a plurality of fluid inlets and fluid outlets defining a plurality of fluid flow paths, wherein the valve assembly comprises a plurality of plungers arranged to open and close respective fluid flow paths, and wherein the valve assembly is arranged such that actuation of the first shape memory alloy element opens one or more of the fluid flow paths, and actuation of the second shape memory alloy element closes one or more of the fluid flow paths.

11. A shape memory alloy actuated valve assembly comprising,
   a valve body, having a fluid inlet and a fluid outlet;
      a plunger, arranged to open and close a fluid flow path between the inlet and the outlet, and having at least one mechanical connection point configured to engage with a shape memory alloy element for actuating the plunger;
      a first shape memory alloy element;
      a second shape memory alloy element;
      a support structure having:
         a front face and a reverse face;
         at least one first engagement point coupling the first shape memory alloy element to the support structure,
         at least one second engagement point coupling a second shape memory alloy element to the support structure;
      wherein the first engagement point is located on the front face of the support structure and arranged such that actuation of the first shape memory alloy element, which extends between and is connected to the first engagement point and a first mechanical connection point on the plunger, can move the plunger to open the fluid flow path, and
      the second engagement point is located on the reverse face of the support structure and is arranged such that actuation of the second shape memory alloy element, which extends between and is connected to the second engagement point and a second mechanical connection point on the plunger, can move the plunger to close the fluid flow path.

12. The shape memory alloy actuated valve assembly of claim 1, wherein the plunger is biased relative to the support structure by a resilient biasing means.

13. The shape memory alloy actuated valve assembly of claim 12, wherein the resilient biasing means is a spring.

14. A shape memory alloy actuated valve assembly comprising,
   a valve body, having a fluid inlet and a fluid outlet;
      a plunger, arranged to open and close a fluid flow path between the inlet and the outlet, and having at least one mechanical connection point configured to engage with a shape memory alloy element for actuating the plunger;
      a first shape memory alloy element;
      a second shape memory alloy element;

a support structure having:
  a front face and a reverse face;
  at least one first engagement point coupling the first shape memory alloy element to the support structure, and,
  at least one further engagement point coupling a second shape memory alloy element to the support structure;
wherein the first shape memory alloy element is arranged between and connected to the first engagement point on the front face of the support structure and a first mechanical connection point on the plunger, and the second shape memory alloy element being arranged between and connected to the further engagement point on the reverse face of the support structure and a second mechanical connection point on the plunger, wherein the valve assembly is arranged such that actuation of both the first and second shape memory alloy elements actuate the plunger to open or close the fluid flow path.

15. A shape memory alloy actuated valve assembly, comprising:
  a valve body, having a fluid inlet and a fluid outlet;
  a plunger, arranged to open and close a fluid flow path between the inlet and the outlet, and having at least one mechanical connection point configured to engage with a shape memory alloy element for actuating the plunger;
  a support structure having:
    at least one first engagement point for coupling a first shape memory alloy element to the support structure, and,
    at least one second engagement point for coupling a second shape memory alloy element to the support structure;
  wherein the first engagement point is arranged such that actuation of the first shape memory alloy element, when extending between and connected to the first engagement point and a mechanical connection point on the plunger, can move the plunger to open the fluid flow path, and
  the second engagement point is arranged such that actuation of the second shape memory alloy element, when extending between and connected to the second engagement point and a mechanical connection point on the plunger, can move the plunger to close the fluid flow path;
  wherein the valve body comprises a plurality of fluid inlets and fluid outlets defining a plurality of fluid flow paths.

16. A shape memory alloy actuated valve assembly, comprising:
  a valve body, comprising a fluid inlet and a fluid outlet;
  a support structure having a first part and a second part, the first part being spaced from the second part to provide a gap between the first and second parts;
  a plunger, arranged in the gap between the first and second parts of the support structure, and arranged to open or close a fluid flow path between the fluid inlet and the fluid outlet;
  a shape memory alloy element providing a mechanical connection between the support structure and the plunger and arranged to actuate the plunger relative to the support structure, wherein the shape memory alloy element is located outside the support structure.

17. The shape memory alloy actuated valve assembly of claim 16, wherein the support structure comprises electromechanical contacts for coupling the shape memory alloy element to the support structure.

18. The shape memory alloy actuated valve assembly of claim 17, wherein the valve assembly comprises a resilient biasing means which biases the plunger toward a position in which the fluid flow path is closed.

19. A shape memory alloy actuated valve assembly, comprising:
  a plunger having at least one mechanical connection point configured to engage with a shape memory alloy element for actuating the plunger;
  a support structure, comprising:
    at least one first engagement point for coupling a first shape memory alloy element to the support structure;
    at least one second engagement point for coupling a second shape memory alloy element to the support structure;
  a valve body, comprising:
    a fluid inlet and a fluid outlet and a fluid flow path therebetween;
    a plunger receiving area, configured for receiving the plunger, actuatable to selectively open or close a flow path between the fluid inlet and the fluid outlet;
  wherein the at least one first engagement point is located proximal to the valve body, to allow actuation of the plunger received in the plunger receiving area, by the first shape memory alloy element, to close the flow path; and
  wherein the at least one second engagement point is located distal from the valve body, to allow actuation of the plunger received in the plunger receiving area, by the second shape memory alloy element, to open the flow path.

* * * * *